United States Patent
Yasuhara (10) Patent No.: US 7,607,034 B2
(45) Date of Patent: Oct. 20, 2009

(54) DATA STORAGE SYSTEM AND CONTROL METHOD THEREOF

(75) Inventor: Masaki Yasuhara, Tokyo (JP)

(73) Assignee: NEC Corporation, Tokyo (JP)

( * ) Notice: Subject to any disclaimer, the term of this patent is extended or adjusted under 35 U.S.C. 154(b) by 694 days.

(21) Appl. No.: 11/091,810

(22) Filed: Mar. 29, 2005

(65) Prior Publication Data
US 2005/0223272 A1 Oct. 6, 2005

(30) Foreign Application Priority Data
Mar. 31, 2004 (JP) ............................. 2004-106261

(51) Int. Cl.
*G06F 11/00* (2006.01)
(52) U.S. Cl. .................... 714/6; 711/114; 711/161; 711/162
(58) Field of Classification Search ................ 714/6; 711/162, 161, 114
See application file for complete search history.

(56) References Cited

U.S. PATENT DOCUMENTS

| | | | |
|---|---|---|---|
| 5,390,187 A * | 2/1995 | Stallmo ........................ | 714/7 |
| 6,807,642 B2 * | 10/2004 | Yamamoto et al. ............. | 714/6 |
| 6,834,326 B1 * | 12/2004 | Wang et al. .................. | 711/114 |
| 6,874,100 B2 * | 3/2005 | Rauscher ..................... | 714/6 |
| 2002/0066050 A1 * | 5/2002 | Lerman et al. ................. | 714/6 |
| 2005/0262390 A1 * | 11/2005 | Okamoto et al. ................ | 714/6 |
| 2006/0179218 A1 * | 8/2006 | Burkey ....................... | 711/114 |
| 2007/0043968 A1 * | 2/2007 | Chen ........................... | 714/6 |

FOREIGN PATENT DOCUMENTS

| | | |
|---|---|---|
| JP | 1-250128 A | 10/1989 |
| JP | 05-108276 A | 4/1993 |
| JP | 05-324579 A | 12/1993 |
| JP | 11-338646 A | 12/1999 |
| JP | 2000-076207 A | 3/2000 |
| JP | 2001-216166 A | 8/2001 |
| JP | 2003-157180 A | 5/2003 |
| JP | 2003-167684 A | 6/2003 |

* cited by examiner

*Primary Examiner*—Robert Beausoliel
*Assistant Examiner*—Philip Guyton
(74) *Attorney, Agent, or Firm*—Sughrue Mion, PLLC (57) ABSTRACT

Hard discs constituting a disc array system are arranged at locations far from one another so as to eliminate their simultaneous damage due to a local disaster and concentration of the processing load thereby suppressing the recovery time upon hard disc failure. It is possible to realize continuous operation without system down even when the other disasters have occurred.

A plurality of hard disc devices are arranged at different locations far from one another, write-in data from a server device is mapped by the RAID method, and a data packet added by the RAID information and the error correction code is distributed to the respective hard discs. Moreover, the line connection device for performing data transfer to the hard disc device has the RAID control function while the main control device is dedicated to monitoring of the hard disc devices and data recovery process upon occurrence of a failure. Moreover, backup of the restored data is transmitted to the server device during a failure recovery process so that recovery re-execution can easily be performed by using the backup when data recovery has not terminated normally.

11 Claims, 11 Drawing Sheets

DATA STORAGE SYSTEM AND CONTROL METHOD THEREOF

BACKGROUND OF THE INVENTION

Field of the Invention

The present invention relates to a data storage system and a control method of the system and in particular, to a data storage system arranging hard disc devices constituting RAID at a distance, its operation method, a line connection device, its control program, and a hard disc device.

Generally, in a disc array device, a plurality of hard disc devices (hereinafter, also referred to as HDD) and a main control device managing them are mounted. Each of the HDD constitutes RAID (Redundant Arrays of Inexpensive Disks). The RAID is a technique for managing a plurality of hard discs as a single hard disc and realizing the high speed of recording/reproduction and the redundancy for the failure according to the level (in general, levels 0 to 5) (for example, see JP 1-250128 A).

In such a disc array device, all the HDD exist in the same device case and accordingly, if a local disaster such as fire, earthquake, electricity service stop, and water leak occurs, all the HDD are damaged and the data cannot be recovered. Moreover, since a plenty of HDD are concentrated in a single place, the installation place should satisfy a certain structural calculation relating to the weight and a countermeasure for concentration of power consumption.

For example, JP 5-324579 A discloses a system including a plurality of computers which are connected by a network and arranged at a distance so as not to be subjected to the same disaster, wherein a file device of one computer stores parity data calculated from data stored in another file device so that even if one computer fails, the data can be recovered.

Moreover, JP 2003-167684 A discloses a system including a disc array device placed in a primary site and a disc array device placed in the secondary site which is far from the primary site and containing a data duplicate, so that if the disc array device in the primary site has failed, the secondary site is used.

The first problem to be solved by this invention is that when devices constituting a disc array system are concentrated at a place and a local disaster occurs at the place, the data cannot be recovered. Moreover, when the main control device managing the RAID has failed, all the data read/write operations stop.

The second problem to be solved is that when one of the hard disc devices has failed and data is recovered from another hard disc device so as to be stored in the replaced hard disc device, the data recovery processing should be started again from the beginning if any failure occurs when data recovered by the main control device is stored into the replaced hard disc device. That is, the degenerated operation state lasts for a long time.

The third problem to be solved is that the load of the main control device controlling the RAID of the disc array system becomes too great. In the disc array system, if one of the hard disc device has failed, it is disconnected from the processing and the degenerated operation is performed. After the hard disc device is replaced with a new one, the main control device rebuilds the data from the remaining hard disc device and stores it in the new hard disc device. If a read request is received during this data recovery, the request is kept waiting until the data recovery is complete or the read processing is performed by the main control device in parallel with the data recovery. However, when the data recovery and read processing are performed simultaneously, the load on the main control device becomes too great, delaying the data recovery processing and prolonging the state lacking in the redundancy, which is not preferable.

SUMMARY OF THE INVENTION

It is therefore an object of the present invention to provide a data storage system capable of evading system down due to a local disaster and reducing the degenerated operation to the utmost extent when a failure has occurred, thereby significantly improving the system and data reliability.

The main characteristic of the present invention is that hard disc devices constituting a disc array system are installed at locations far from one another and a data packet having the RAID-constituting information configured on the upper-node layer is transmitted and received to/from the hard disc devices. In a preferable embodiment, a line connection device for distributing a data packet to the respective hard disc devices has the RAID processing function and the line connection device performs the process of data write-in and data read-out while a main control device is dedicated to the monitoring of the hard discs and data recovery upon occurrence of a failure. Furthermore, in data recovery after disc replacement due to a failure, the main control device transmits backup of the data to be stored in the replaced hard disc device to the server device so that the backup data can be utilized when an error has occurred during storage into the hard disc device. In another embodiment, the line connection device and the RAID control device are duplicated so that even if a disaster occurs in the installation location of the main control device, the another device can take over the process. That is, a system redundancy is available.

More specifically, the present invention provides a data storage system for performing data write-in/read-out according to a request from a server device, the system comprising: a plurality of hard disc device arranged far from one another; and data distribution means for distributing write-in data from the server device to each of the hard disc devices by the RAID method, wherein the data distribution means maps the write-in data by the RAID method, adds RAID information to each of the data which has been mapped, thereby creating a data packet, and transmits the data packet to each of the hard disc devices.

The data packet transmitted/received between the data distribution means and the hard disc devices may contain an error correction code for data communication.

The hard disc devices may be arranged at locations far from one another so that they are not subjected simultaneously to the same disaster.

When one of the hard disc device is replaced with a new one due to a failure, the data distribution means transmits the backup of the data restored for the hard disc device to the server device, and when storage of the restored data into the replaced hard disc device has not terminated normally, the backup data is received from the server device so that the recovery process is re-executed by using the backup data.

The system of the present invention may further comprise second distribution means installed at a location different from the aforementioned data distribution means and switch means for switching the connection with the server device from the aforementioned data distribution means to the second distribution means when the aforementioned data distribution means has failed.

The second distribution means may be connected to the hard disc devices by a second data line which is different from the data line connecting the aforementioned data distribution means to the hard disc devices.

The data distribution means may include: a main control device for monitoring the hard disc devices and performs data recovery when one of the hard disc devices has failed; and a line connection device for controlling a data line connecting the main control device to the hard disc devices; and the main control device may transmit a data write-in/read-out request received from the server device, directly to the line connection device, and the line connection device may perform distribution and read-out of the write-in data to the hard disc devices.

By arranging the hard disc devices at location far from one another and distributing a data packet having RAID information on the upper-node layer into a data line, it is possible to realize a wide-area disc array system in which a plurality of hard disc devices are arranged at various locations. Thus, even when a local disaster occurs, it is possible to reduce the risk that the hard disc devices simultaneously stop. Moreover, by distributing the hard disc devices to different locations, it is possible to eliminate concentration of the device weight or the power consumption as well as the problem of heat increase caused by concentration of the devices.

BRIEF DESCRIPTION OF THE DRAWINGS

FIG. 3 is a flowchart explaining the operation performed when data is written in.

THE BEST MODE FOR CARRYING OUT THE INVENTION

Description will now be directed the best mode for carrying out the present invention with reference to the attached drawings.

Embodiment 1

Figure 1:
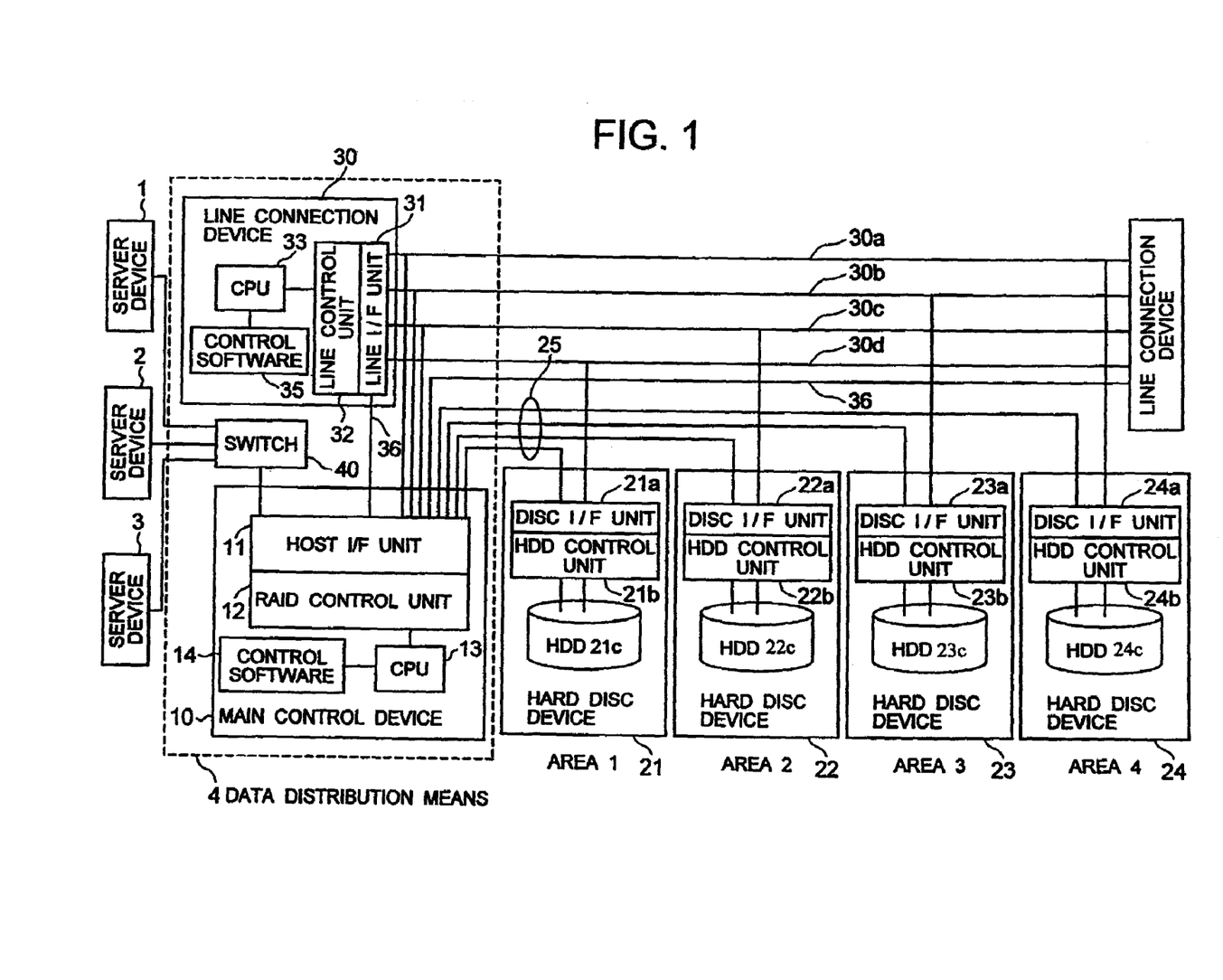
FIG. 1 is a block diagram showing configuration of a data storage system according to the present invention.

FIG. 1 shows configuration of a first embodiment of the present invention. As shown in FIG. 1, the data storage system according to the first embodiment includes data distribution means 4 connected to server devices 1 to 3, a plurality of hard disc devices 21 to 24, and data lines 30a to 30d for connecting them. The data distribution means 4 has a main control device 10 and a line connection device 30 for controlling the data lines 30a to 30d. The server devices 1 to 3 are client servers performing creation and updating of recording data and are connected to the main control device 10 via a switch 40. The switch 40 performs management about which server device is to use the data storage system according to a predetermined condition and in accordance with a request from the server devices 1 to 3 and the main control device 10. The line connection device 30 is duplicated on the data line and the both have the same structure.

The hard disc devices 21 to 24 are separated from one another so that they are not subjected to simultaneously to an earthquake or fire occurring locally. They are arranged in areas 1 to 4 which are far from one another. The hard disc devices are connected to the data lines 30a to 30d and include disc interface units 21a to 24a, HDD control units 21b to 24b, and hard discs 21c to 24c. Each of the disc interface units 21a to 31a is connected to the main control device 10 via a control line 25 and reports its status information to the main control device 10 periodically by itself or upon inquiry from the main control device 10.

The hard disc devices 21 to 24 constitute a disc array system of the RAID method. The RAID is a technique for managing/operating a plurality of hard disc devices as a single device as a whole. For example, in the RAID-5, parity is added to the recording data and the data is distributed/stored into a plurality of hard discs. When one of the hard disc devices has failed, the data is read out from the remaining hard disc devices and the recording content of the hard disc which has failed can be restored. Since the RAID is a know technique (for example see the aforementioned JP 1-250128 A), its detailed explanation is omitted in this specification. Thus, when the hard disc devices 21 to 24 constituting the RAID are arranged in a place far from one another, it is possible to prevent simultaneous stop of a plurality of hard disc devices when a disaster has occurred, which disables recovery of the data.

For example, the hard disc device 21 receives data transmitted from the line connection device 30 via the disc interface unit 21a, performs error correction by using the error correction code (ECC) contained in the data packet, deletes the ECC, and stores the data in the hard disc 21c under its control. Moreover, upon reception of a data read request from the line connection device 30, the hard disc device 21 extracts the data from the hard disc 21c, generates and adds an ECC to it, and transmits the data to the line connection device 30. The remaining hard disc devices 22 to 24 also have the same functions.

Figure 2:
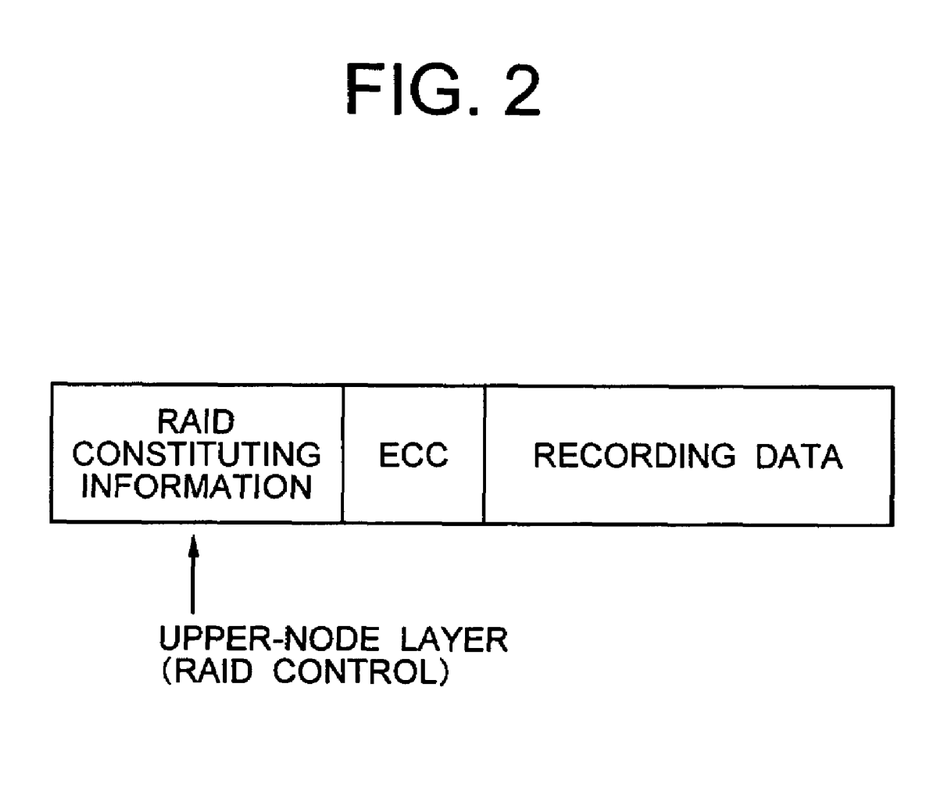
FIG. 2 shows structure of a data packet passed between a line connection device 30 and hard disc devices 21 to 24.

The line connection device 30 includes a line interface unit 31, a line control unit 32, a CPU 33, and control software 35. The control software 35 is an operation program of the line connection device 30 which is read out from a memory to the CPU and executed. The line connection device 30 it self has the RAID read/write control function. That is, the line connection device 30 causes the CPU 33 to map the write data in the sector unit of the hard disc devices 21 to 24, add a parity, generate unit data to be distributed to the respective hard disc devices, and generate a redundant bit ECC for data communication and RAID-constituting information for each unit data. The line control unit 32 adds the ECC and the RAID-constituting information to the unit data, thereby forming a data packet as shown in FIG. 2. Here, the RAID-constituting information includes information required for the RAID configuration such as LUN (logical unit number) information, a LUN recognition bit, a RAID control bit, a RANK recognition bit, and an HDD recognition bit. The control of the lines between the line connection device 30 and the respective hard disc devices follows the ordinary TCP/IP but the upper-node layer follows the RAID control.

Moreover, upon reception of a data read request from the main control device 10, the line control unit 30 causes the CPU 33 to search the data and requests the data to each hard disc device via the line control unit 32 and the line interface unit 31. The data transmitted from the respective hard disc devices are received by the line interface unit 31 and connected in the line control unit 32 according to the RAID information contained in the reception data, after which the data is transmitted to the main control device 10. It should be noted that the line connection unit 30 is connected to the main control device 10 by the control line 36 and they perform exchange of information.

The main control device 10 includes a host interface unit 11, a RAID control device 12, a CPU 13, and management software 14 stored in an internal memory. The management software 14 is a program for controlling the operation of the device 10 and read into the CPU 13 so as to be executed upon start of the device 10. Upon reception a data write-in/read-out request from the server devices 1 to 3, the main control device 10 transmits the request directly to the line connection device 30. Moreover, the main control device 10 receives read-out data relating to the request from the line connection device 30 and transmits it to the server device as the request source.

The main control device 10 monitors the hard disc devices 21 to 24 via the control line 25. If a failure occurs in one of the hard disc devices, the main control device 10 disconnects the hard disc device from the process, performs degenerated operation, and reports the failure to the operator and the line connection device 30. After the hard disc device which has failed is replaced with a new one, the main control device 10 requests the line connection device 30 to transmit the data to be stored in the hard disc device. When the line connection device has received recovery data read out from the respective hard disc devices, the main control device 10 builds the data for the hard disc device replaced and returns it to the line connection device 30. The restored data is subjected to mapping in the line connection device 30 and added by an ECC before being transmitted to the hard disc device replaced.

Moreover, when an error has occurred in one of the hard disc devices, the main control device 10 reports it to the server device and transmits the data received from the line connection device 30 upon data recovery, to the server device. Normally, the speed of the connection path connecting the server devices 1 to 3 and the main control device 10 is higher than the data line 25 by 3 to 10 times. Moreover, the recovery data should be subjected to mapping in the line connection device 30 and receive addition of ECC data before being stored in the remote hard disc device. Accordingly, transfer to the server device is complete by far earlier than the storage of the recovery data in the new hard disc device from the line connection device 30, and this is stored as the backup data in the server device. Thus, if failure has occurred when storing the recovery data in the new hard disc device, it is possible to use the backup data stored in the server device, thereby re-performing the recovery work in the early stage.

Figure 3:
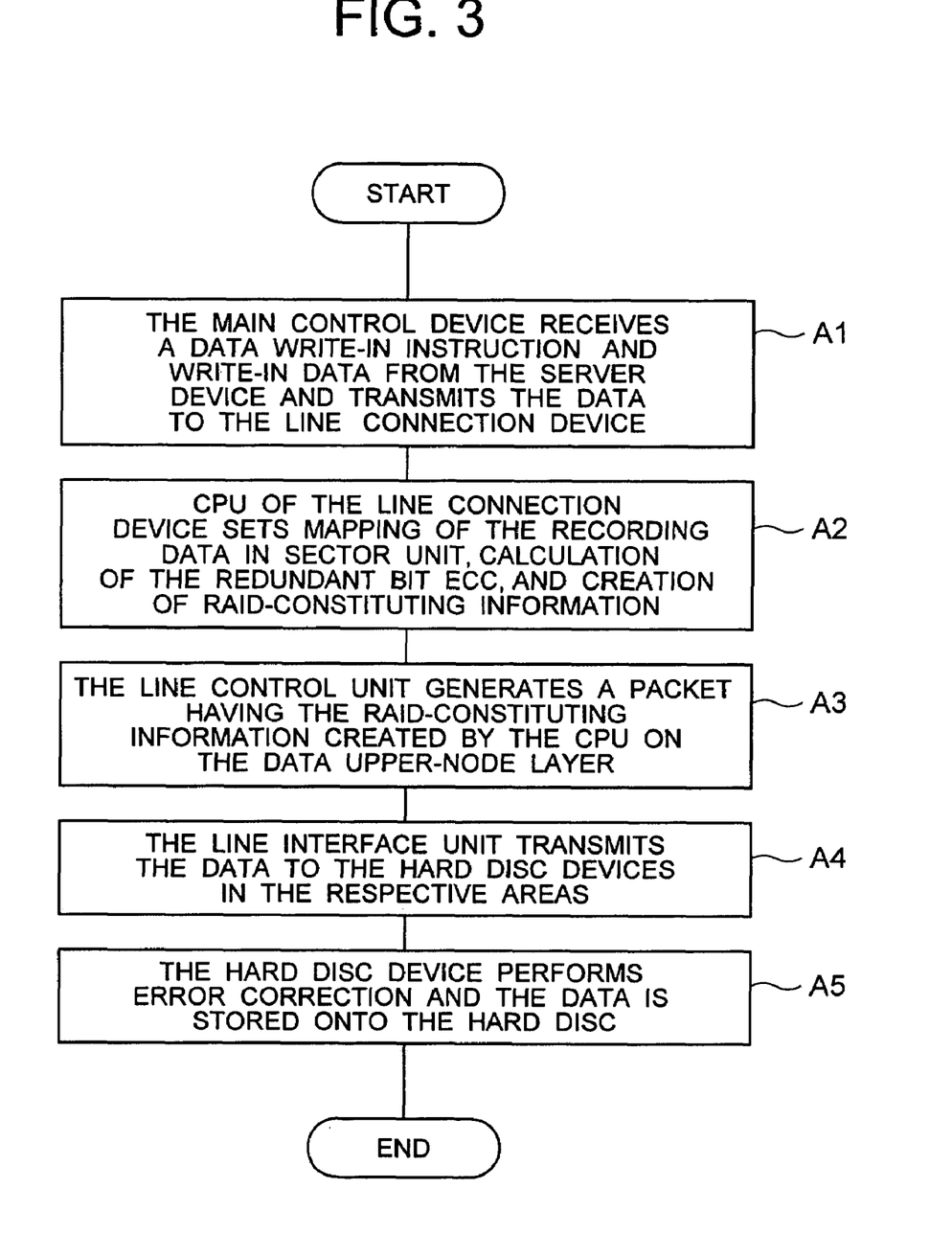

Hereinafter, explanation will be given on the operation of the data storage system. FIG. 3 is a flowchart explaining the process performed by the line connection device when write-in data is received from one of the hosts. When a data write-in request is caused in one of the server devices 1 to 3, the server device transmits a write-in instruction and write-in data to the main control device 10. When the main control device receives this write-in request, the main control device 10 transmits the write-in instruction and the write-in data directly to the line connection device 30 (step A1). The line interface unit 31 of the line connection device 30 receives them and the CPU 33 sets mapping of the recording data in the sector unit, calculates redundant bit ECC, and generates RAID constituting information (step A2). Moreover, the line control unit 32 generates a data packet building the RAID constituting information generated in the CPU 33, on the upper-node layer of the unit data (step A3). The data packet is transmitted from the line interface unit 31 to the hard disc devices 21 to 24 in the respective areas (step A4). The disc interface units 21a to 24a of the respective hard disc devices receive the packet, corrects an error in the communication data according to the ECC, and stores the data onto the hard discs 21c to 24c under their control (step A5). Here, the ECC is deleted but the RAID constituting information is kept added when the data is stored onto the hard discs.

Figure 4:
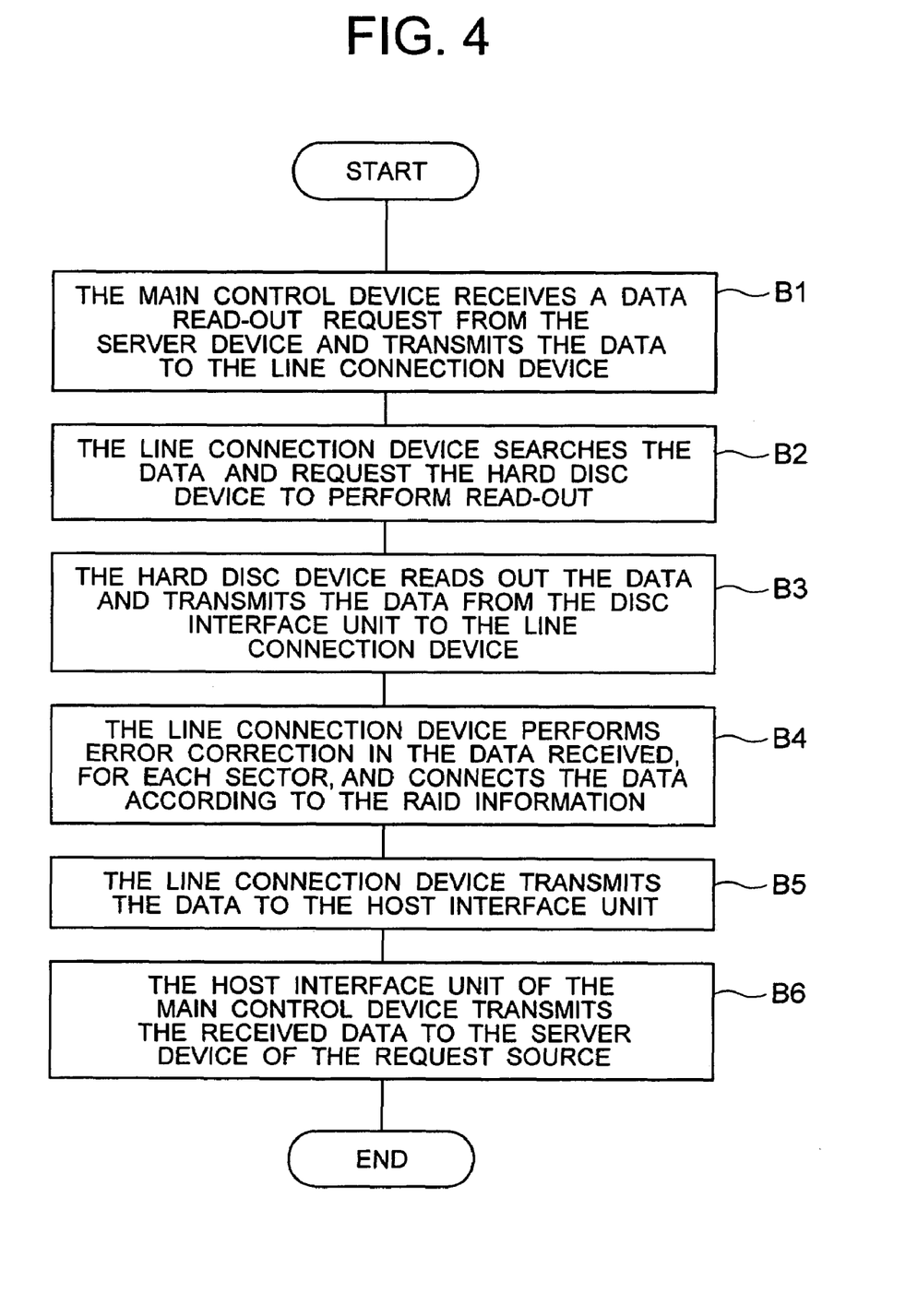
FIG. 4 is a flowchart explaining the operation performed when data is read out.

FIG. 4 is a flowchart explaining the process performed when a data read-out request is received from one of the hosts. When the main control device 10 receives a data read-out request from one of the server devices 1 to 3, it transmits the request directly to the line connection device 30 (step B1). The line connection device 30 searches the data relating to the read-out request and requests the respective hard disc devices 21 to 24 to transmit the data (step B2). The hard disc devices 21 to 24 extract the data, adds a redundant bit ECC to it, and transmits it from the line interface units 21a to 24a to the line connection device 30 (step B3). The line control unit 32 of the line connection device 30 performs error correction by using the ECC and connects the data according to the RAID information contained in the data for each of the sectors received (step B4). After this, the line connection device 30 transmits the data relating to the request to the host interface unit 11 of the main control unit 10 (step B5) and the host interface unit 11 transfers the data to the server device as the request source (step B6).

Figure 5:
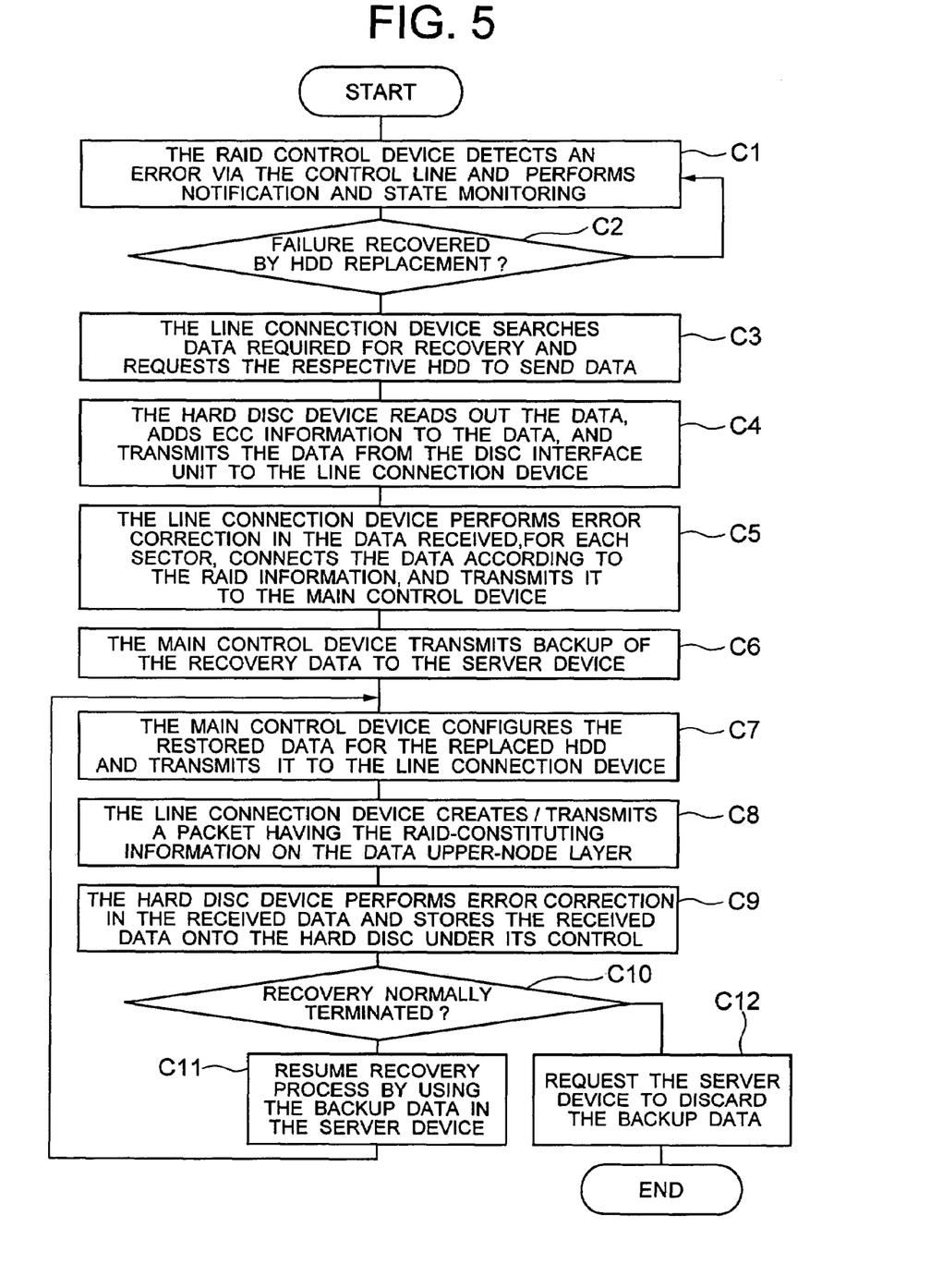
FIG. 5 is a flowchart explaining the operation performed when a failure has occurred.
Figure 6:
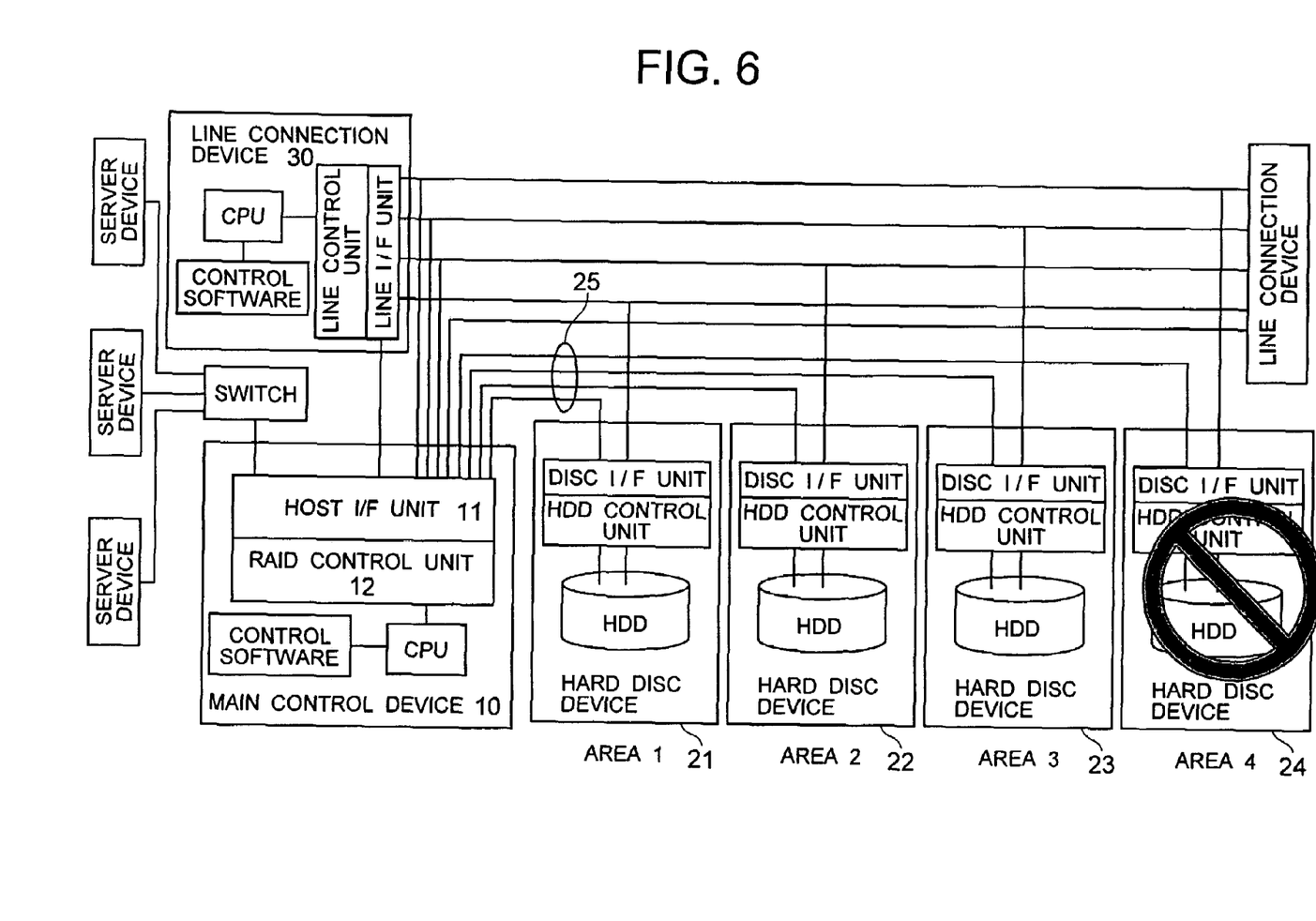
FIG. 6 shows a state when a failure has occurred in a hard disc device 24.

FIG. 5 is a flowchart explaining the process performed when a failure has occurred in one of the hard discs due to a local disaster such as fire and water leak. As has been described above, the main control device 10 monitors the states of the hard disc devices 21-24 by using the control line 25. When a failure has occurred in one of the hard disc devices, it is detected by the main control device 10. FIG. 6 shows a case when a failure has occurred in the hard disc device 24 installed in the area 4.

Figure 7:
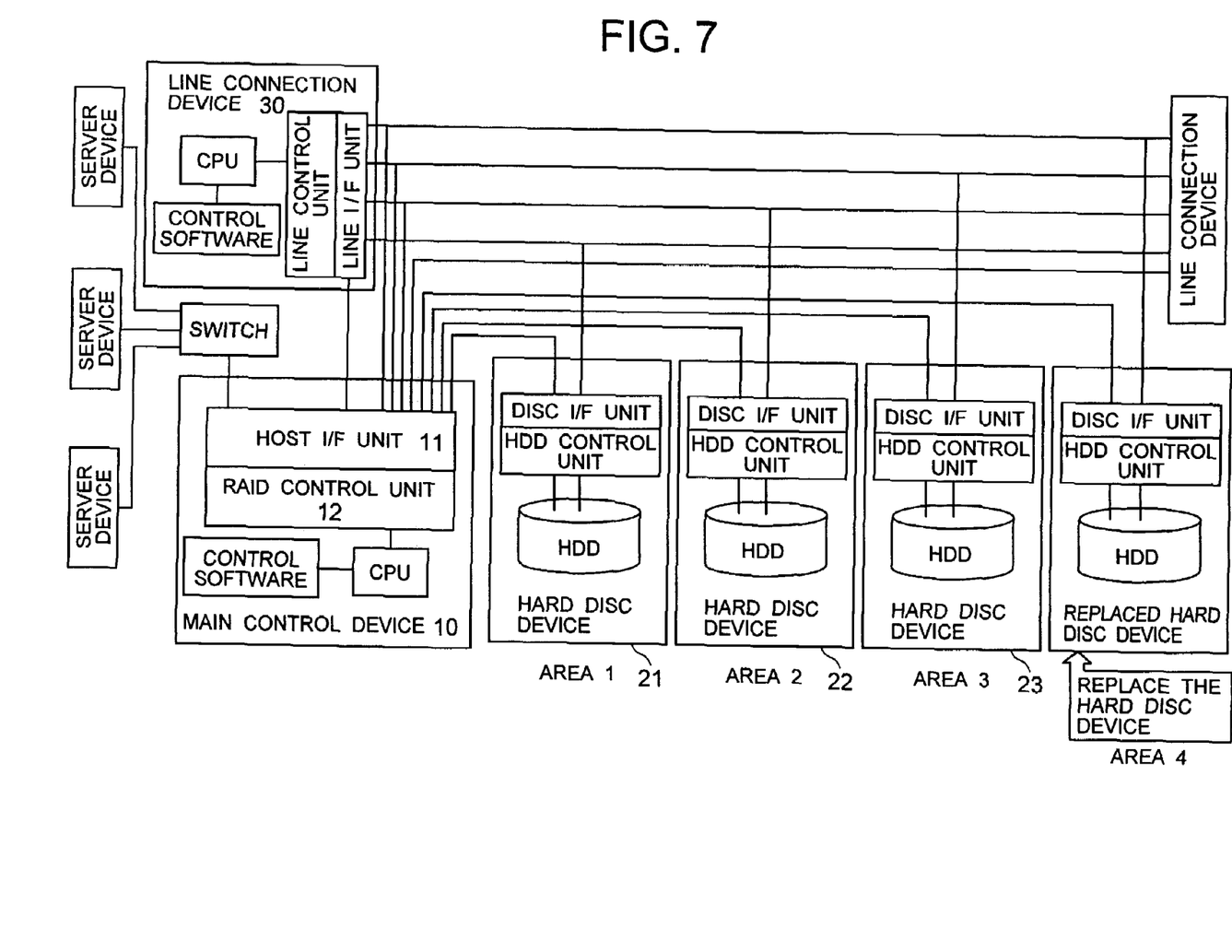
FIG. 7 shows a state after the hard disc device 24 is replaced with a new one.

Upon detection of the failure, the main control device 10 reports it to the line connection device 30, disconnects the hard disc device 24 from the RAID process, switches the operation to the regenerated state, reports the situation to the operator and/or the server devices 1 to 3 so as to prompt replacement of the hard disc device 24. Moreover, the main control device 10 monitors the further state of the hard disc device by using the control line 25 (step C1). In this case, the hard disc device or the hard disc is replaced with a new one by manual operation (see FIG. 7). It should be noted that monitoring of the hard disc devices is performed by periodically transmitting a check list from the main control device 10 to the hard disc devices 21 to 24 and analyzing status information in the returned check list.

Figure 8:
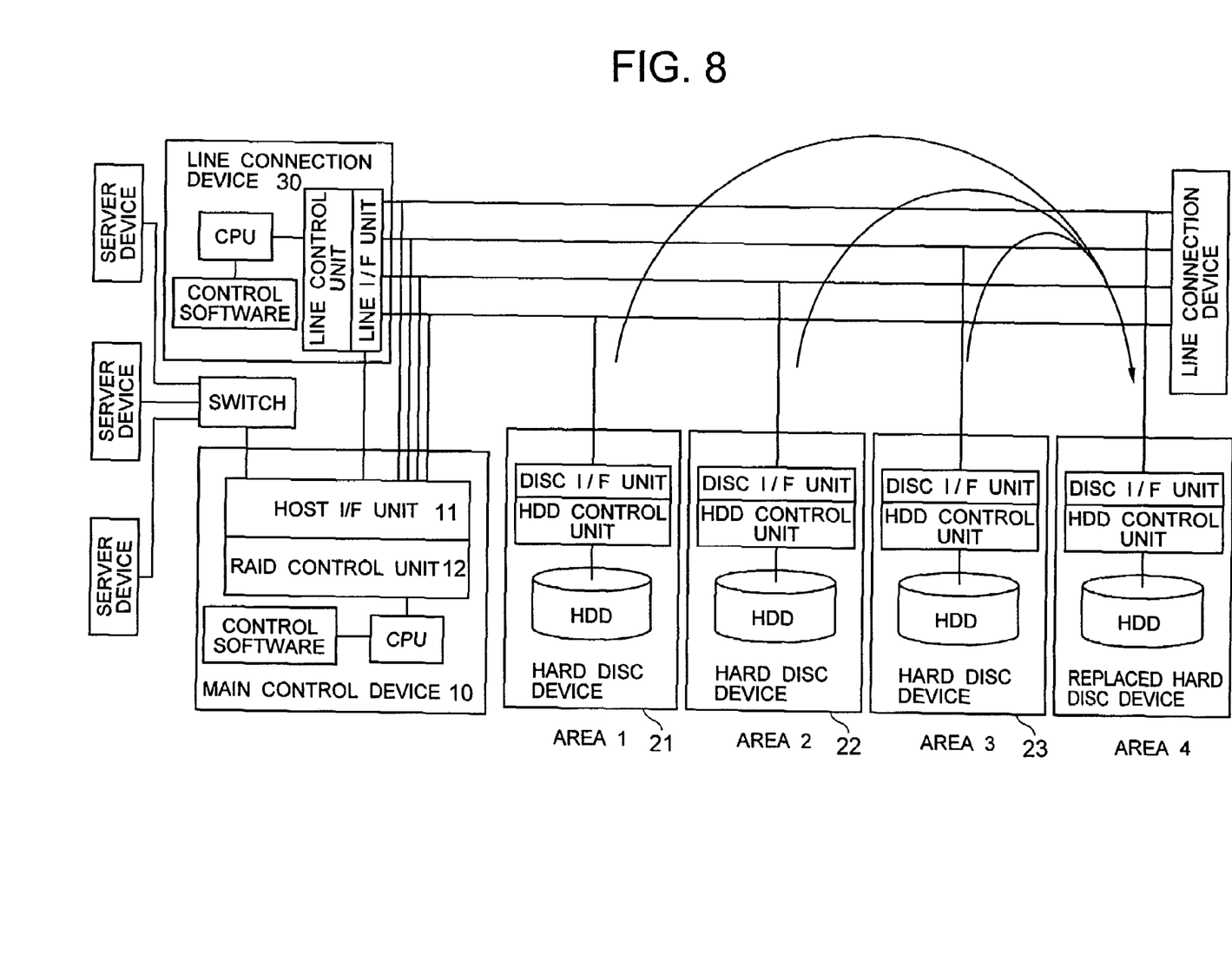
FIG. 8 shows how data is restored from another hard disc device.
Figure 9:
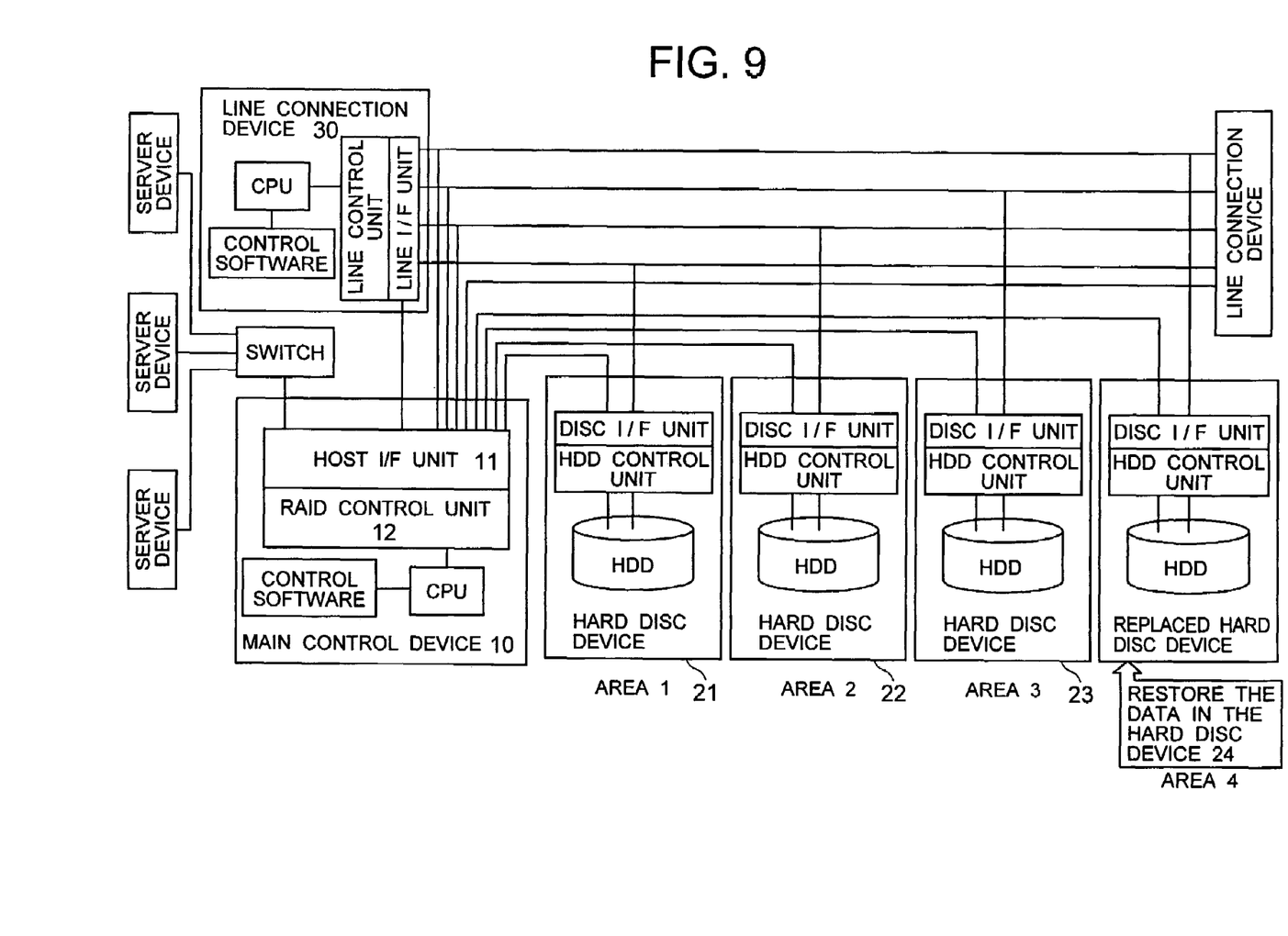
FIG. 9 shows how data is restored from another hard disc device.

Upon detection of recovery of the failure by replacement of the hard disc device (step C2), the main control device 10 reports it to the line connection device 30 so as to start a data recovery process (see FIG. 8 and FIG. 9). In this process, the line connection device 30 searches data required for data recovery in the hard disc device which has failed and requests the remaining hard disc devices to transmit the corresponding data (step C3). Upon reception of the request, the hard disc device reads out the corresponding data, adds an ECC to it, and transmits the data to the line connection device 30 (step C4). The line connection device 30 performs error correction connects data according to the RAID information contained in the data packet, and transmits the recovered data to the main control device 10 (step C5).

The main control device 10 receives this, acquires the reception data to its storage area, and transmits its copy to the server device. This is temporarily stored as backup data in the server device (step C6). In this case, the server device to which the backup data is transmitted may be a predetermined one or it is also possible to inquire the server devices 1 to 3 from the main control device 10 and transmit the data to a server device having the largest empty storage capacity.

After this, the main control device 10 builds the data received from the line connection device 30, for the hard disc device 24, completes the restored data, and transmits it to the line connection device 30 (step C7). This step performs RANK adjustment and LUN adjustment in accordance with the replaced hard disc device.

The line connection device 30 receives the restored data from the main control device 10, generates a data packet by configuring the RAID constituting information on the upper-node layer of the data and adding an ECC to it, and transmits it to the replaced hard disc device (step C8). The hard disc device receives this, performs error correction by using the ECC, deletes the ECC, and stores the restored data onto the hard disc under its control (step C9).

Here, if a new failure is caused in the line connection device 30 or the hard disc device between the transmission of the restored data by the main control device 10 and storage in the hard disc device and the storage of the restored data cannot be terminated normally (step C10), the main control device 10 requests the server device to which backup data has been transmitted in step S7, so as to send the backup data and re-performs recovery work by using the backup data (step C11). Thus, even when a failure has occurred before completing storage of the data onto the replaced hard disc device, the recovery work can rapidly be re-performed by using the backup data. That is, as compared to the data recovery by acquiring data again from the respective hard disc devices, the processing load is reduced and the regenerated operation period can be shortened. On the other hand, when the data recovery operation in steps C8 and C9 terminates normally, the server device is requested to discard the backup data (step C12).

Moreover, by dedicating the main control device to monitoring of the respective hard discs and data recovery when a failure has occurred, and assigning the RAID control relating data write-in/read-out to the line connection device, even when a read-out request occurs during data recovery, for example, it is possible to execute read-out without delaying the data recovery process. Moreover, instead of the conventional way in which a plenty of small data groups destined to respective hard disc devices are transmitted from the main control device to the line connection device and then to the respective hard disc device, the present invention is configured so that the write-in/read-out data is sent all at once from the main control device to the line connection device, thereby reducing the device processing load and the data line load.

Thus, when a hard disc device is replaced with a new one during data recovery, the recovered data for the hard disc device is also sent to one of the server devices, so that the backup data in the server device can be utilized when an unexpected failure has occurred when storing the recovered data in the replaced hard disc device, thereby rapidly re-performing the recovery work.

It should be noted that the process of sending the backup data to the server device in the aforementioned flowchart may be performed only when a request is made from the server device. That is, for example, when a failure of a hard disc device is reported to a server device, the server device checks its storage capacity and only when it has a sufficient empty capacity, it makes a request for the backup data. It is also possible to provide such a configuration that a user of the server device to which the regenerated operation of the RAID system is notified selects whether to store the backup data in the server device by considering the data importance or the like. In this configuration, the main control device 10 sends the restored data to the server device only when the request for the backup data is made. When the backup data is stored in the server device, even if a failure occurs while storing the restored data in the main control device 10, after the failure is recovered, the data restoration can be rapidly performed by using the backup data.

It should be noted that when a data read-out request is made in one of the server devices during data recovery upon failure occurrence, the flowcharts of FIG. 3 and FIG. 5 are performed in parallel. That is, the main control device 10 transmits the read-out request directly to the line connection device. The line connection device 30 reads out the data from the respective hard disc devices and sends the data to the main control device 10. The main control device 10 transmits the read-out data to the server device. According to this system, while the main control device 10 performs the recovery work of step C6, the line connection device 30 can execute the process relating to the request from the server device. Accordingly, no large load is applied even when the data recovery and read-out are to be executed simultaneously and it is possible to prevent delay of the data recovery work.

Moreover, in this system, the line connection device 30 is duplicated on the data line. When one of the line connection devices has failed, the other device takes over the process. That is, the main control device 10 monitors the state of the line connection device 30 by using the control line 36 and when the device 30 has stopped due to failure, the data and request transmission destination is switched to the other device. Data line control by the line connection device 30 has a large processing load and is destroyed comparatively easily due to disconnection of an active line cord. Thus, the duplication can enhance the system reliability.

Embodiment 2

Figure 10:
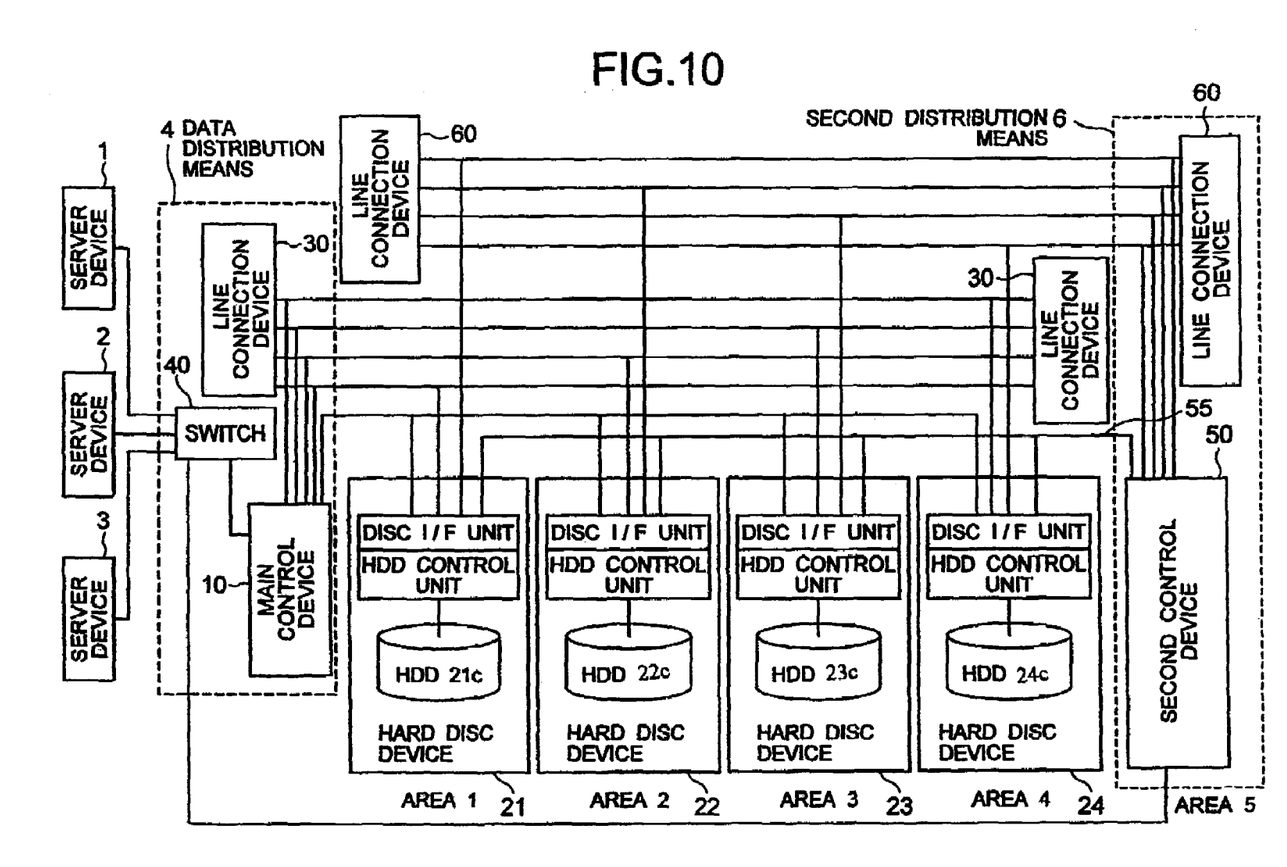
FIG. 10 is a block diagram showing configuration of a data storage system according to a second embodiment of the present invention.

FIG. 10 shows configuration of a data storage system according to another embodiment of the present invention. As shown in FIG. 10, according to this embodiment, separately from the data distribution means 4 shown in FIG. 1 (the main control device 10 and the line connection device 30), second distribution means 6 (a second control device 50 and a line connection device 60) is arranged in an area apart from them. In this embodiment also, the line connection device 60 connected to the second control device 50 is duplicated. The second control device 50 is connected to a switch 40 which connects the host devices 1 to 3 and the main control device 10. When the main control device in the area 1 has failed, the switch 40 automatically switches the connection destination of the host devices 1 to 3 to the second control device 50. Thus, even when a disaster occurs in the area 1 where the main control device 10 is installed, the system can continue operation without stopping.

As compared to the conventional disc array device in which a hard disc device is multiplexed to cope with a trouble, in this invention, not only the hard disc device but also the RAID control device and the line connection device are multiplexed so that even if one of these devices has failed, the operation as the disc array system can be continued, thereby improving the system reliability. It should be noted that in the embodiment of FIG. 10, the data distribution means is duplicated to increase the redundancy of the control itself. However, this redundancy may also be realized by triplication or more instead of duplication.

Figure 11:
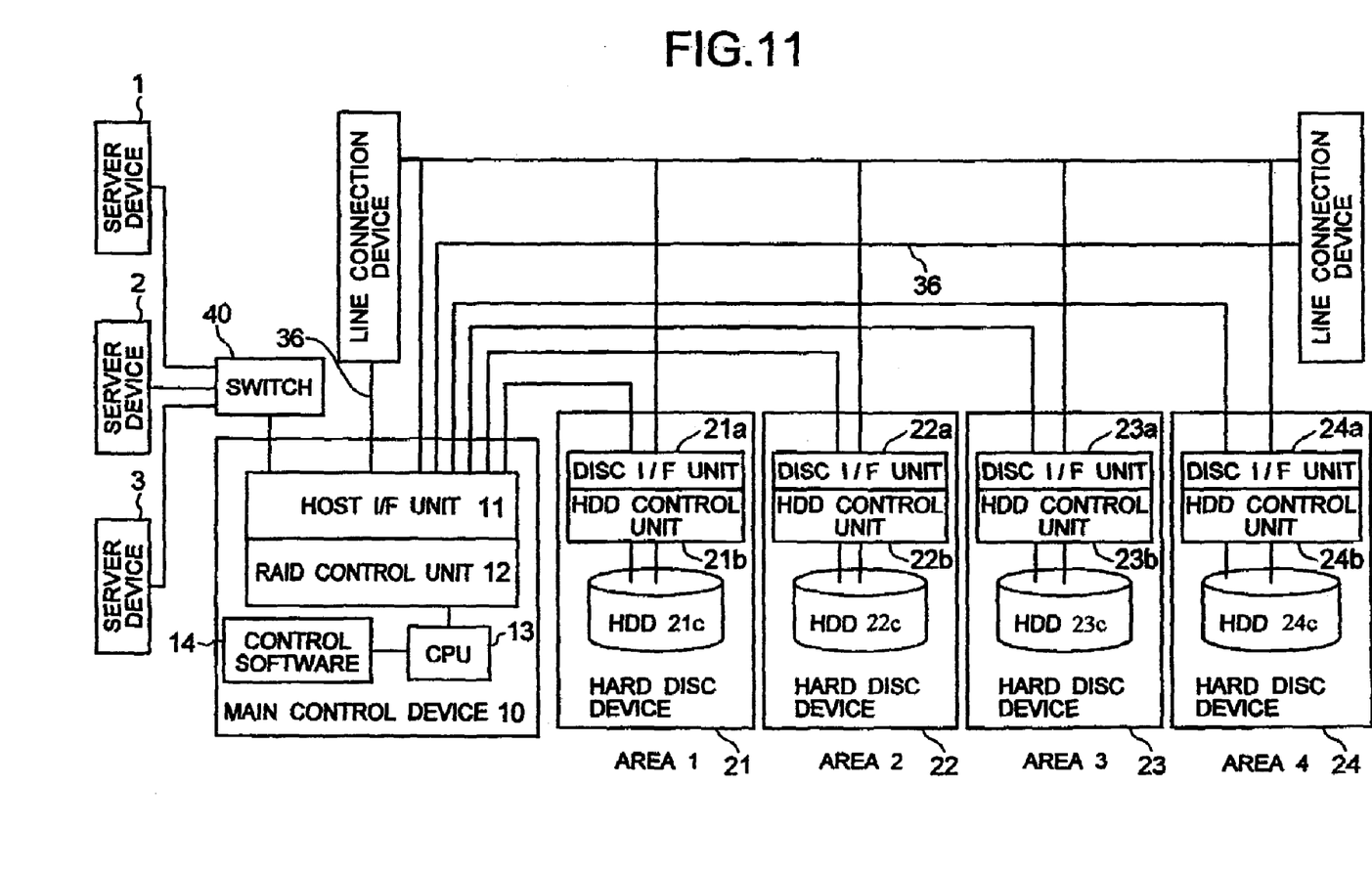
FIG. 11 is a block diagram showing configuration of a data storage system according to a third embodiment of the present invention.

Explanation has been given on the embodiments of the present invention. However, the technical range of the present invention is not to be limited to the aforementioned embodiments but can be modified in various ways. For example, in the aforementioned embodiments, the four data lines are used for connection between the hard disc devices 21 to 24. However, as shown in FIG. 11, the lines may be multiplexed by the line connection device 30 so as to reduce the number of lines used. Thus, it is possible to reduce the space required for line arrangement, the line use fee, the management fee, and the like. It should be noted that for the line multiplexing, it is possible to employ various methods such as the band-multiplex method and the time-division multiplex method.

Moreover, the system and the method of the present invention need not have all the elements in the aforementioned embodiments. For example, addition of an error correction code ECC to the transmission/reception data and multiplexing of the line connection device are not indispensable matters. The present invention is characterized in that: firstly, the hard disc devices are arranged at locations far from one another and a data packet having the RAID information on the upper-node layer is transmitted to each of the hard disc devices; secondly, the RAID read/write function is arranged on the line connection device so as to reduce the load on the main control device; and thirdly, backup of the restored data is transmitted to the server device during a failure recovery process so that the backup can be used for re-execution of the data recovery if it has not terminated normally.

The data storage system according to the present invention can be applied to file systems in general which are non-stop operated such as a file server in a company or the Web server of the Internet.

What is claimed is:

1. A data storage system for performing data write-in/read-out according to a request from a server device, the system comprising: a plurality of hard disc devices arranged far from one another; and data distribution means for distributing write-in data from the server device to each of the hard disc devices by the RAID method, wherein the data distribution means maps the write-in data by the RAID method, adds RAID information to each of the data which has been mapped, thereby creating a data packet, and transmits the data packet to each of the hard disc devices; and wherein when one of the hard discs is replaced with a new one due to a failure, the data distribution means transmits the backup of the data restored for the hard disc device to the server device, and when storage of the restored data into the replaced hard disc device has not terminated normally, the backup data is received from the server device so that the recovery process is re-executed by using the backup data.

2. A data storage system as claimed in claim 1, wherein the data packet transmitted/received between the data distribution means and the hard disc devices contains an error correction code for data communication.

3. A data storage system as claimed in claim 1, wherein the hard disc devices are arranged at locations far from one another so that they are not subjected simultaneously to the same disaster.

4. A data storage system as claimed in claim 1, the system further comprising second distribution means installed at a location different from the aforementioned data distribution means and switch means for switching the connection with the server from the aforementioned data distribution means to the second distribution means when the aforementioned data distribution means has failed.

5. A data storage system as claimed in claim 4, wherein the second distribution means is connected to the hard disc devices by a second data line which is different from the data line connecting the aforementioned data distribution means to the hard disc devices.

6. A data storage system as claimed in claim 1, wherein the data distribution means includes: a main control device for monitoring the hard disc devices and performs data recovery when one of the hard disc devices has failed; and a line connection device for controlling a data line connecting the main control device to the hard disc devices; the main control device transmitting a data write-in/read-out request received from the server, directly to the line connection device, and the line connection device performing distribution and read-out of the write-in data to the hard disc devices.

7. A hard disc device as claimed in claim 1, wherein the hard disc device receives a data packet from the line connection device, performs error correction of the reception data according to an error correction code, delete the error correction code, and stores the reception data having the RAID-constituting information on the hard disc under its control.

8. A data storage system comprising a plurality of hard disc devices and RAID control means operating the hard disc devices by the RAID method so that data write-in/read-out is performed according to a request from a server device, wherein when one of the hard disc devices has failed and is replaced with a new one, the RAID control means transmits backup of the data restored for the hard disc device to the server device, and when the process of storing the restored data into the replaced hard disc device has not terminated normally, the RAID control means receives the backup data from the server device and re-executes the recovery process by using the backup data.

9. A control method for a data storage system for operating a plurality of hard disc devices, which are arranged at locations far from one another, by the RAID method and performing data write-in/read-out according to a request from a server device, the method comprising; mapping the write-in data from the server device by the RAID method; generating RAID-constituting information for each unit data mapped; creating packet data by adding the RAID-constituting information to the unit data; distributing the packet data to the hard disc devices, and wherein the data storage system comprises: a main control device for monitoring the hard disc devices and performs data recovery when one of the hard disc devices has failed; and a line connection device for controlling a data line connecting the main control device to the hard disc devices;

the method further comprising, upon occurrence of a data write-in request in the server device, transmitting the request, by the main control device, directly to the line connection device; and mapping, by the line connection device, the recording data in the sector unit of the hard disc and transmitting a data packet added by an error correction code and the RAID-constituting information to each of the hard disc devices;

monitoring, by the main control device, each of the hard disc devices and, upon replacement one of the hard disc devices due to a failure, restoring, by the line connection device, the data to be stored in the replaced hard disc device and sending the data to the main control device; a step of building, by the main control device, the restored data for the replaced hard disc device and returning it to the line connection device; and a step of adding, by the line connection device, an error correction code to the data and sending it to the hard disc device; and sending, by the main control device, backup of the recovered data built for the replaced hard disc device, to the server device.

10. A control method for the data storage system as claimed in claim 9, the method further comprising creating an error correction code for data communication for each of the unit data and adding it to the packet data.

11. A control method for a data storage system for operating a plurality of hard disc devices by the RAID method and performing data write-in/read-out according to a request from a server device, the method comprising: a step of, upon replacement of one of the hard disc devices due to a failure, transmitting backup of the data restored for the hard disc device from the data storage system to the server device; a step of, upon unsuccessful termination of storage of the restored data into the replaced hard disc device, receiving the backup data from the server device and re-executing the recovery process by using the backup data.

* * * * *